(12) United States Patent
Kearney et al.

(10) Patent No.: US 10,549,238 B2
(45) Date of Patent: Feb. 4, 2020

(54) METHODS OF REGENERATING A RESIN USED TO DECOLORIZE A BIOMASS FEEDSTREAM AND RELATED SYSTEMS

(71) Applicant: Amalgamated Research LLC, Twin Falls, ID (US)

(72) Inventors: Michael M. Kearney, Twin Falls, ID (US); Timothy E. Pryor, Twin Falls, ID (US)

(73) Assignee: Amalgamated Research LLC, Twin Falls, ID (US)

( * ) Notice: Subject to any disclaimer, the term of this patent is extended or adjusted under 35 U.S.C. 154(b) by 111 days.

(21) Appl. No.: 15/956,451

(22) Filed: Apr. 18, 2018

(65) Prior Publication Data

US 2018/0311619 A1 Nov. 1, 2018

Related U.S. Application Data

(60) Provisional application No. 62/492,803, filed on May 1, 2017.

(51) Int. Cl.
*B01D 61/02* (2006.01)
*B01D 61/10* (2006.01)
*B01J 49/57* (2017.01)
*B01J 49/07* (2017.01)
*B01J 49/20* (2017.01)
*B01D 61/12* (2006.01)

(52) U.S. Cl.
CPC .......... *B01D 61/022* (2013.01); *B01D 61/10* (2013.01); *B01J 49/07* (2017.01); *B01J 49/57* (2017.01); *B01D 61/12* (2013.01); *B01D 2317/025* (2013.01); *B01J 49/20* (2017.01)

(58) Field of Classification Search
CPC ...... B01D 61/022; B01D 61/10; B01D 61/12; B01D 2317/025; B01D 2311/04; B01D 61/027; B01J 49/07; B01J 49/57; B01J 49/20

See application file for complete search history.

(56) References Cited

U.S. PATENT DOCUMENTS

| 5,441,689 A | 8/1995 | Laity |
| 2004/0006222 A1 | 1/2004 | Paananen et al. |

(Continued)

FOREIGN PATENT DOCUMENTS

WO 2016/008745 A1 1/2016

OTHER PUBLICATIONS

Meadows et al., The Recovery of Brine from Resin Regeneration Effluent by Nanofiltration, Proceedings of the South African Sugar Technologists' Association, Jun. 1992, pp. 159-165.

(Continued)

*Primary Examiner* — Arun S Phasge
(74) *Attorney, Agent, or Firm* — TraskBritt

(57) ABSTRACT

Methods of regenerating a strong base anion resin are described. The method comprises collecting a salt-containing product from a chromatographic system configured to process a biomass derived material. The salt-containing product is processed through a nanofiltration membrane to collect a salt-containing permeate, which is used to regenerate a spent strong base anion resin. The biomass may be a plant-based material, such as sugar beets or sugar cane. A system for regenerating a strong base anion resin is also described.

17 Claims, 4 Drawing Sheets

(56) References Cited

U.S. PATENT DOCUMENTS

2005/0211240 A1* 9/2005 Theoleyre ............ A23C 9/1425
127/55
2016/0107122 A1 4/2016 Theoleyre et al.

OTHER PUBLICATIONS

Rein, Peter, Cane Sugar Engineering, Second Edition, 2017, pp. 611-616, Verlag Dr. Albert Bartens KG, Berlin, Germany.
ISA/220—Notification of Transmittal of Search Report and Written Opinion of the ISA, or the Declaration dated Aug. 2, 2018 for WO Application No. PCT/US18/028161.

* cited by examiner

METHODS OF REGENERATING A RESIN USED TO DECOLORIZE A BIOMASS FEEDSTREAM AND RELATED SYSTEMS

CROSS-REFERENCE TO RELATED APPLICATION

This application claims the benefit under 35 U.S.C. § 119(e) of U.S. Provisional Patent Application Ser. No. 62/492,803, filed May 1, 2017, the disclosure of which is hereby incorporated herein in its entirety by this reference.

TECHNICAL FIELD

The disclosure, in various embodiments, relates generally to chemistry and to methods of regenerating a resin used to process a biomass material. More specifically, the disclosure, in various embodiments, relates to methods of regenerating a resin used to process a biomass material, such as a sugar-containing feed stream.

BACKGROUND

Strong base anion resins are often used for decolorization purposes, in which colored impurities are removed from a feed stream. As one example from the cane sugar refining industry, decolorization is used to produce a crystallized sugar having an acceptable white color. Because many of the color bodies in a cane processing stream are hydrophobic and anionic, strong base anion resins are conventionally used for decolorization since the color bodies will bind to this type of resin through ionic and hydrophobic interactions. For this reason, cane refinery decolorization using strong base anion resins has become common.

Using ion exchange resin for decolorization has been less common in the beet sugar industry since the process, when operated conventionally, is capable of producing a white crystallized sugar without additional purification. However, more recent processes which increase the recovery of beet sugar, such as chromatography, have resulted in higher color feed to the crystallization step and have motivated a consideration of decolorization. The use of chemicals and waste disposal problems associated with anion resin decolorization have hindered widespread adoption of this technology. Similar problems exist in the cane sugar industry but are often accepted because decolorization is required to produce a sellable sugar.

The various problems associated with the anion resin decolorization process are primarily due to the method of regenerating the strong base anion resin. The regeneration is a well-known process and typically includes feeding a regenerant solution that includes sodium chloride (NaCl) and sodium hydroxide (NaOH) across the strong base anion resin, as shown in FIG. 1. The regenerant solution includes 10% NaCl and 1.0% NaOH. For additional regeneration, fresh NaCl and NaOH are added to the regenerant solution. The regenerant solution displaces the exchanged and adsorbed color bodies. The used regenerant is referred to as regenerant waste or spent regenerant, and is considered a waste stream. The spent regenerant contains most of the NaCl from the regenerant solution in addition to various organic color compounds previously removed by the strong base anion resin. Since the spent regenerant is a caustic brine, the spent regenerant is an undesirable material because it has a very high chemical oxygen demand (COD), high salt content, and poorly degradable color bodies. In some cases, the spent regenerant disallows the use of the process due to effluent discharge limits.

To overcome some of the waste problems, a reprocessing-recycle technique using nanofiltration to recover a fraction of the NaCl has been in use since the 1990s. In this method, the spent regenerant is passed through a crossflow membrane nanofiltration system, producing a membrane permeate and a membrane retentate, as shown in FIG. 2. A significant amount of the NaCl and NaOH of the spent regenerant passes through the membrane and is recovered in the membrane permeate. Fresh NaCl and NaOH are added to the membrane permeate for subsequent resin regeneration. A significant reduction in salt consumption may be achieved by recycling part of the spent regenerant in this manner. However, the process still requires a fresh NaCl and NaOH makeup and a spent regenerant bleed-off and salt/organic containing concentrate must be dealt with. The membrane retentate is sent to waste.

DETAILED DESCRIPTION

A system and methods of regenerating a strong base anion resin used to decolorize a biomass feed stream are disclosed. The system includes a chromatographic system, a nanofiltration system, and a decolorization system. The strong base anion resin is regenerated using a salt-containing fraction that is produced by the chromatographic system during separation of the biomass feed stream. Since the salt-containing fraction is a by-product of the chromatographic process, no regenerant waste stream is produced, reducing cost and environmental issues associated with the waste. The salt-containing fraction includes inorganic anions, such as chlorides, sulfates, nitrates, or combinations thereof, and organic ions, such as citrates, lactates, malates, or combinations thereof produced during chromatography of the biomass feed stream. No extraneous chemical compounds or additives are used in the salt-containing fraction to regenerate the strong base anion resin. Once regenerated, the strong base anion resin may be used in subsequent decolorization processes, such as to decolorize another biomass feed stream.

The biomass feed stream may be a material derived from a living organism, such as a plant-based material. The biomass material may include, but is not limited, to sugar beets, sugar cane, cellulosic biomass, hydrolyzed biomass, wood, fruits, vegetables, corn, fermented biomass, reactor product biomass, other plant-derived material, or combinations thereof. The biomass feed stream contains a large variety of anions including, for example, inorganic anions such as chloride anions and sulfate anions. The biomass feed stream may also include many organic anions including citrate, lactate, malate, and many others. The biomass feed stream may be a solution produced during sugar processing, such as during the processing of molasses and may be an aqueous solution of a sugar, such as sucrose, that is to be separated into two or more fractions by the chromatographic system.

The biomass feed stream is subjected to a chromatography process to separate components in the biomass feed stream, increasing the purity of the desired components. The impurities may provide a color to the biomass feed stream due to the presence of color bodies. By way of example only, the color bodies may be organic compounds that provide color to the biomass feed stream. The system and method according to embodiments of the disclosure may be used with any feed stream that produces a salt-containing fraction following chromatography and that is amenable to decolorization with the strong base anion resin. Specifically, the system and method according to embodiments of the disclosure may be used for processing of any biomass since salts are a component of biomass materials. In some embodiments, the biomass feed stream is described herein as a feed stream from sugar processing.

Figure 1:
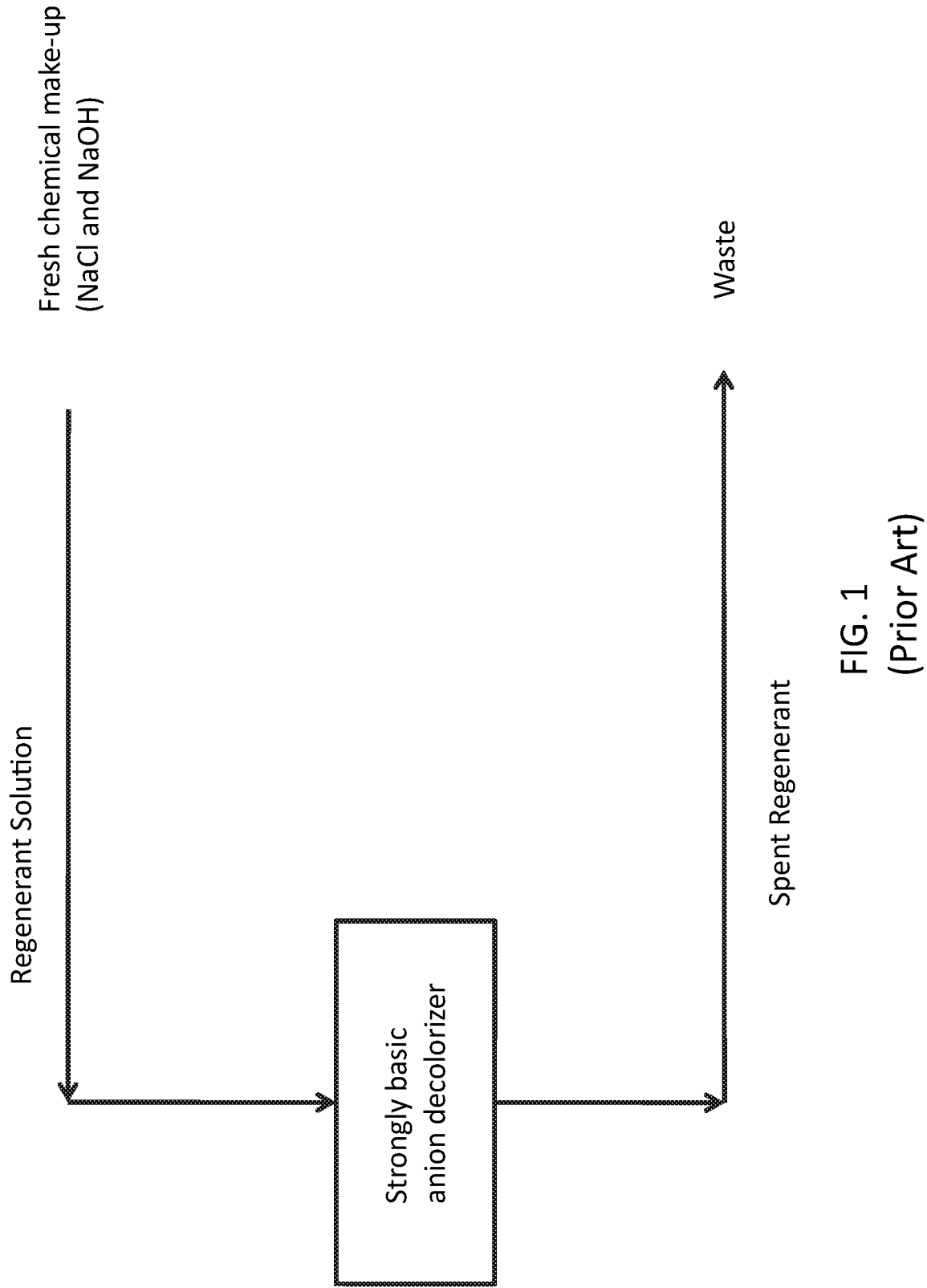
FIG. 1 is a schematic system used to regenerate a strong base anion resin.
Figure 2:
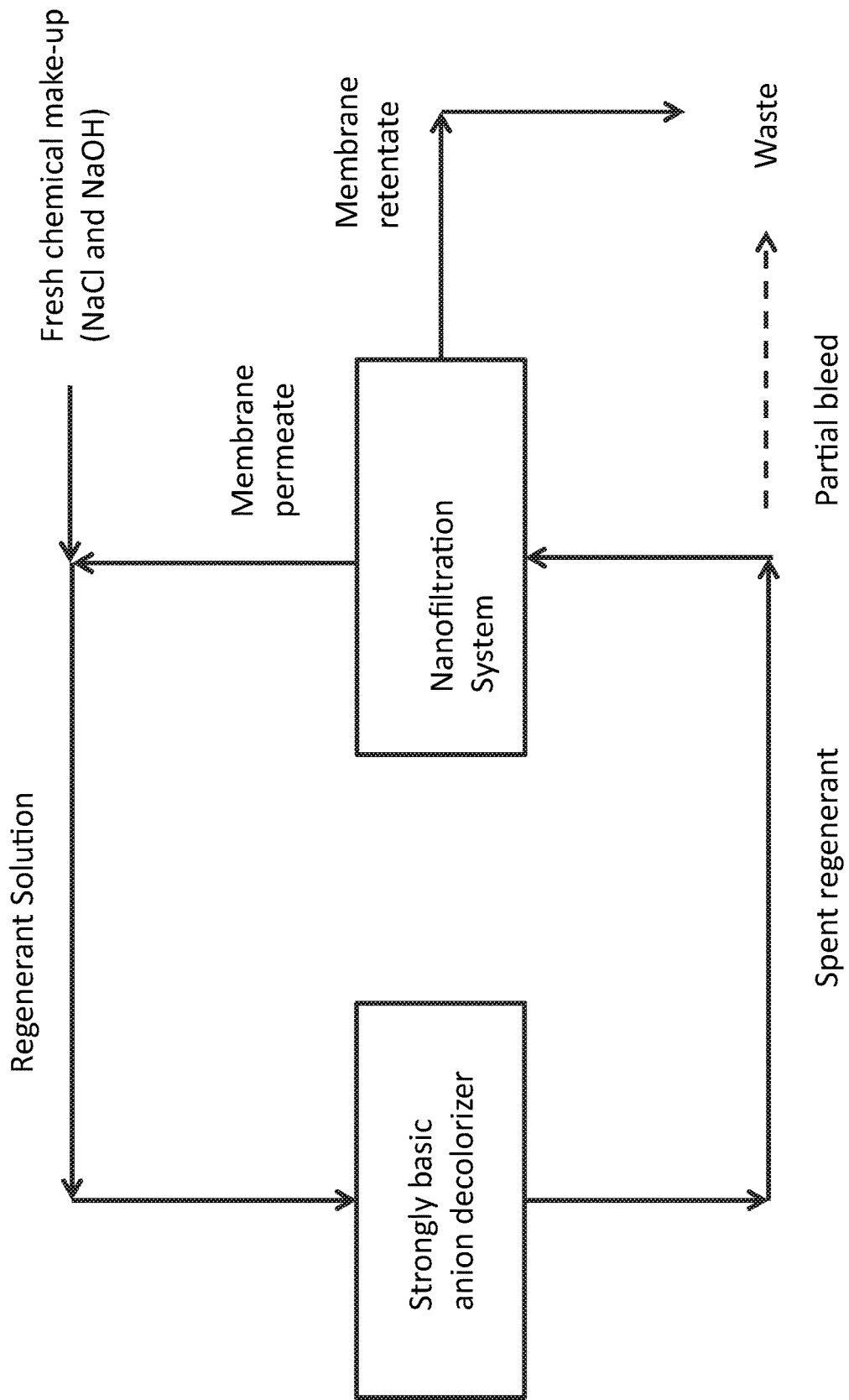
FIG. 2 is a schematic system used to regenerate a strong base anion resin using recirculation of reprocessed spent regenerant
Figure 3:
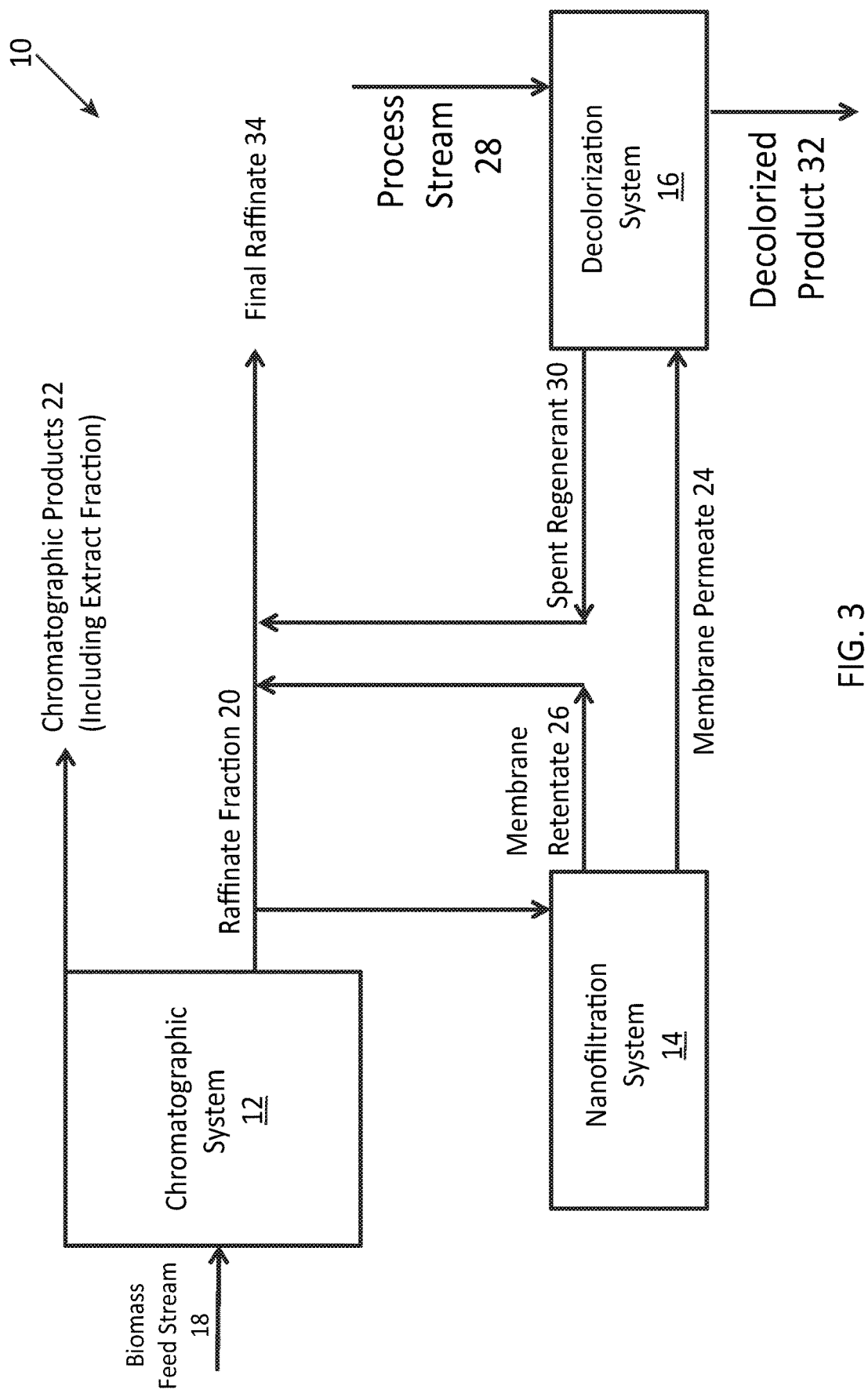
FIG. 3 is a schematic of a system used to regenerate a strong base anion resin according to an embodiment of the invention.

As shown in FIG. 3, the system 10 includes a chromatographic system 12, a nanofiltration system 14, and a decolorization system 16. A biomass feed stream 18 may be subjected to a chromatographic process in the chromatographic system 12 to separate the biomass into two or more fractions including a salt-containing raffinate fraction 20 and a chromatographic product 22 (e.g., an extract fraction). The biomass feed stream 18 may be introduced into the chromatographic system 12 and passed through a resin contained in one or more beds or columns of the chromatographic system 12. The resin, beds or columns, and other components of the chromatographic system are conventional and, therefore, are not discussed in detail herein. The chromatographic resin may be selected depending on the products of the biomass feed stream 18 to be separated. The raffinate fraction 20 contains salts from the biomass feed stream 18 that are separated by the chromatographic process. In addition to separating the biomass feed stream 18 into desired chromatographic products 22, the chromatographic system 12 may also distribute incoming color among the chromatographic products 22.

At least a portion of the raffinate fraction 20 from the chromatographic system 12 may be filtered through the nanofiltration system 14 that includes a membrane. The raffinate fraction 20 may, optionally, be concentrated before the filtration or may be introduced to the nanofiltration system 14 without concentration. A concentration of the salt in the raffinate fraction 20 may be determined by conventional techniques before the nanofiltration. The raffinate fraction 20 may be passed through the membrane of the nanofiltration system 14, producing a membrane permeate 24 and a membrane retentate 26. The membrane of the nanofiltration system 14 filters out larger molecular weight compounds while allowing smaller molecular weight compounds, such as the salts, and liquid, e.g., water, to pass through the membrane. The larger molecular weight compounds make up the membrane retentate 26 and the smaller molecular weight compounds, such as chloride salts or sulfate salts, in the liquid make up the membrane permeate 24. The membrane permeate 24 contains a higher percentage of salts on dissolved solids than the raffinate fraction fed to the membrane.

The membrane of the nanofiltration system 14 may be a food grade membrane selected to separate the salts from other components in the raffinate fraction 20. By way of example only, the membrane may be a Koch SR3D™ membrane commercially available from Koch Membrane Systems, Inc. (Wilmington, Mass., US), a Koch SelRO® MPS membrane commercially available from Koch Membrane Systems, Inc. (Wilmington, Mass., US), a Koch HFK membrane commercially available from Koch Membrane Systems, Inc. (Wilmington, Mass.), a Trisep UA60 membrane commercially available from Microdyn-Nadir US, Inc. (Goleta, Calif., US), or a Hydranautics 30 phT membrane, commercially available from Hydranautics—A Nitto Group Company (Oceanside, Calif., US). The membrane may have a molecular weight cutoff of about 10,000 Daltons, such as from about 1,000 Daltons to about 3000 Daltons or about 200 Daltons.

As shown in FIG. 3, the decolorization system 16, following regeneration with the membrane permeate 24, is used to decolorize a process stream 28 and produce decolorized product 32. The decolorization system 16 includes one or more columns, beds, etc., that contain a strong base anion resin. The strong base anion resin in the decolorization system may be in a spent form or in a regenerated form. The decolorization system 16 may contain two or more decolorization columns or beds, such as in a carousel system. The decolorization columns or beds may include the regenerated strong base anion resin, the spent strong base anion resin, or combinations thereof. By way of example only, the columns or beds may range in depth from about 2 feet to about 10 feet. The strong base anion resin may be a strong base anion resin of the acrylic type or of the styrenic type. An acrylic type strong base anion exchange resin may include, but is not limited to, Amberlite™ FPA98 Cl, PUROLIIE® A860S, or LEWATIT® 55528. A styrenic type strong base anion exchange resin may include, but is not limited to, Amberlite™ FPA900UPS, PUROLITE® A420S, LEWATIT® 56268, or Mitsubishi Diaion™ PA308.

The membrane permeate 24 is used in the decolorization system 16 to regenerate spent strong base anion resin, producing regenerated strong base anion resin (not shown) and spent regenerant 30. The salt concentration of the membrane permeate 24 may affect regeneration of the spent strong base anion resin. Therefore, the membrane permeate 24 may be used with or without concentration. The membrane permeate 24, which includes salts from the biomass feed stream 18, may be used to regenerate the spent strong base anion resin present in the decolorization system 16. Since the membrane permeate 24 includes salts from the raffinate fraction 20, which was produced following separation by the chromatographic system 12, the membrane permeate 24 is a salt-containing fraction. The membrane permeate 24 may be flowed over (e.g., passed through) the spent strong base anion resin in the decolorization system 16 at a temperature of from about 50° C. to about 70° C. By way of example only, the membrane permeate 24 may be flowed through the spent strong base anion resin at a flow rate of from about 2 bed volumes/hour to about 10 bed volumes/hour. As the membrane permeate 24 passes through the decolorization system 16, color bodies absorbed by the spent strong base anion resin are desorbed, at least partially restoring the capacity of the strong base anion resin. Once regenerated, the strong base anion resin may be used to decolorize another biomass feed stream 18 having color bodies, for example, a product (e.g., another chromatographic product 22) from the chromatographic system 12 or other processing streams (e.g., the process stream 28) or additional processing streams from a biomass material.

It was surprising that a byproduct (e.g., the raffinate fraction 20) of the chromatography process may be used to regenerate the spent strong base anion resin. Since the raffinate fraction 20 may include some color bodies, the membrane permeate 24 may also exhibit a color. It was surprising that the membrane permeate 24 regenerated the spent strong base anion resin since colored solutions are believed to be incapable of effectively regenerating spent resins. It was also surprising that the decolorization process may be operated without using extraneous chemicals to regenerate the spent resin or without producing a regenerant waste stream. With conventional regeneration, the spent regenerant is a waste stream due to its salt content and caustic nature. However, with embodiments of the disclosure, the spent regenerant 30 is similar in composition to the raffinate fraction 20 and the membrane retentate 26, and may be collected and sold as a raffinate product. Since conventional regeneration is accomplished with pure or nearly pure Cl- and OH-anions, this is another unusual characteristic of the embodiments of the disclosure.

The decolorization system 16 may also be used to decolorize a chromatographic product 22 or a portion of the chromatographic product 22 from the chromatographic system 12. Thus, the chromatographic product 22 may be used in place of the process stream 28. As the chromatographic product 22 passes through the decolorization system 16, color bodies are absorbed by the strong base anion resin, reducing the color of the chromatographic product 22 and producing the decolorized product 32. The color bodies are predominantly anionic and, therefore, readily absorb to the strong base anion resin, such as by combination of hydrophobic reactions and ionic bonds. The color of the resulting decolorized product 32 may be reduced by at least about 50%, such as by at least 60%, at least 70%, at least 80%, or at least 90% compared to the color of the chromatographic product 22 before decolorization. Conventional operating parameters for decolorizing the chromatographic product 22 may be used and, therefore, are not discussed in detail herein. By way of example only, the chromatographic product 22 may be flowed over (e.g., passed through) the strong base anion resin of the decolorization system 16 at between about 2 bed volumes/hour and about 12 volumes/hour at a maximum temperature of between about 50° C. and about 80° C.

The membrane retentate 26 from the nanofiltration system 14 may, optionally, be combined with the remainder of the raffinate fraction 20 from the chromatographic system 12 and the spent regenerant 30 from the decolorization system 16 since the compositions of the raffinate fraction 20, membrane retentate 26, and spent regenerant 30 are similar. Although the combined raffinate fraction may be more colored (e.g., exhibit increased color), any additional handling or processing may be conducted on a single stream, e.g., a final raffinate 34, avoiding processing complications. The combined raffinate fraction, membrane retentate 26, and spent regenerant 30 of the final raffinate 34 may be concentrated and sold as animal feed. Since the spent regenerant 30 is combined with the raffinate fraction 20 and membrane retentate 26 and reused, no regenerant waste stream is produced.

While FIG. 3 illustrates the process acts as happening sequentially, the process acts may be occurring simultaneously. For example, the raffinate fraction 20 may be collected from the chromatographic system 12 and passed through the membrane of the nanofiltration system 14 at the same time that a biomass feed stream 18 is being decolorized on a previously regenerated resin in the decolorization system 16. The decolorization system 16 may contain two or more decolorization columns, such as a carousel system, in which the process acts may occur simultaneously and continuously with different operations occurring in different columns or beds of the strong base anion resin. The chromatographic product 22 may be decolorized in one or more decolorization columns of the decolorization system 16, while regeneration of spent strong base anion resin is occurring in one or more other decolorization columns. By way of example only, if the decolorization system 16 includes three columns, two of the columns may be run in series to decolorize the chromatographic product 22 while the spent strong base anion resin of the third column is regenerated.

Figure 4:
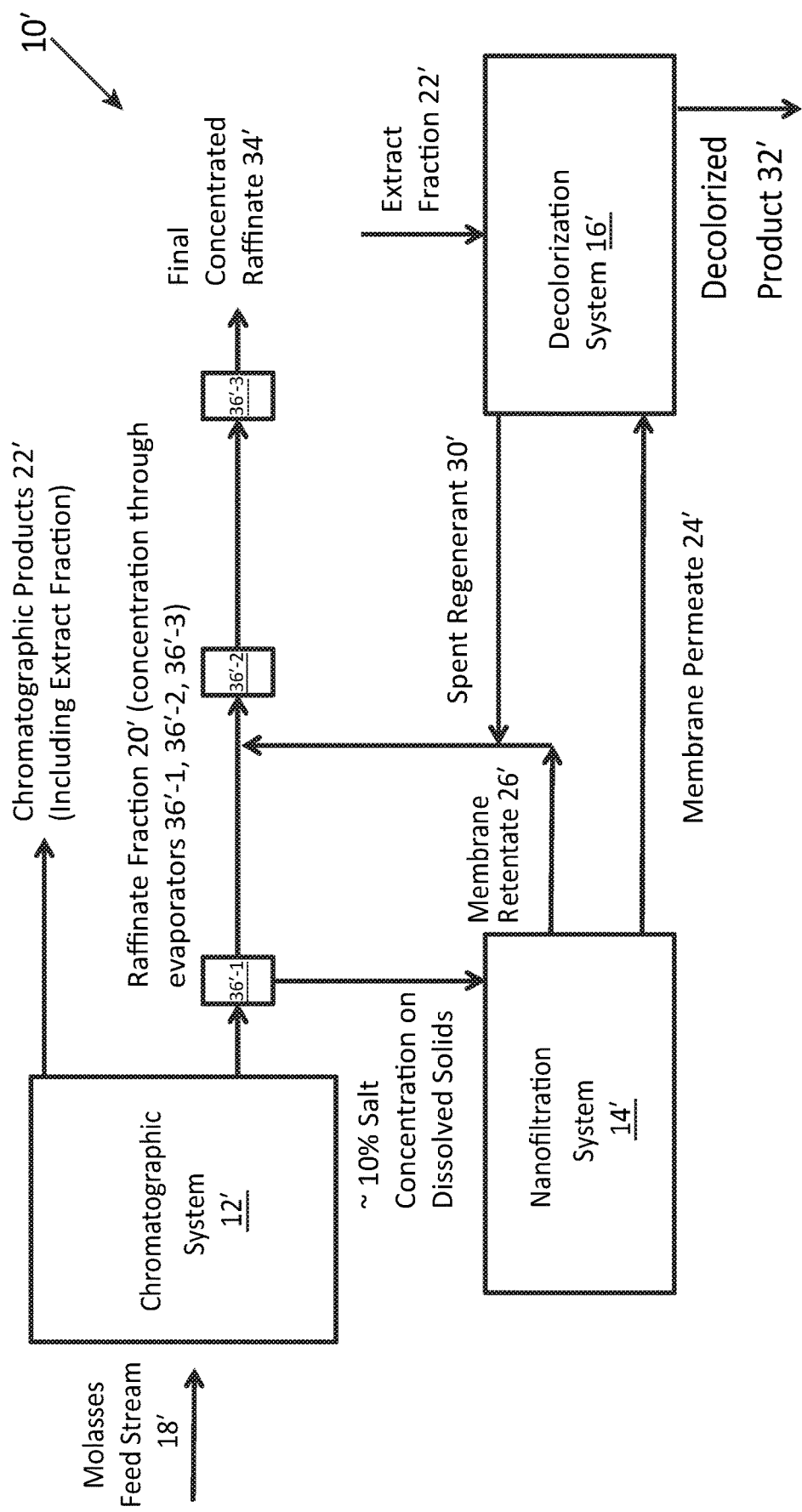
FIG. 4 is a schematic of a system used to regenerate a strong base anion resin according to an embodiment of the invention used in a beet sugar factory.

In some embodiments, the biomass material is derived from sugar beets and the method according to embodiments of the disclosure is used to regenerate the strong base anion resin. After the sucrose is removed from the sugar beets via crystallization, the remaining molasses feed stream from a beet sugar factory (final runoff) contains sucrose and non-sucrose components from which no additional sucrose can be crystallized due to kinetic and thermodynamic limits. The purity of the molasses may be about 60% by weight sucrose on dissolved solids. As shown in FIG. 4, by passing the molasses through the chromatographic system 12', a high purity sugar solution (e.g., a chromatographic product 22', the extract), can be obtained which allows additional crystallization. However the chromatographic product 22' can exhibit a high color, for example 10,000 or greater ICUMSA which interferes with the production of white sugar. Embodiments of the disclosure may be used to reduce the color of the chromatographic product 22' and regenerate the strong base anion resin. As shown in FIG. 4, a molasses feed stream 18' is introduced to the chromatographic system 12' and separated into two or more products, including the chromatographic product 22' and a raffinate fraction 20' in a similar manner to that discussed above for FIG. 3. The chromatographic product 22' contains most of the sucrose at a high purity, for example, at 90% sucrose on dissolved solids along with a proportion of the molasses color bodies. The raffinate fraction 20' from the chromatographic system 12' contains non-sucrose components, a proportion of the molasses color bodies, and a majority of charged molecules, particularly salts such as chlorides or sulfates.

A portion of the raffinate fraction 20' from the chromatographic system 12' may be collected and passed through the nanofiltration system 14' to produce the membrane permeate 24' and the membrane retentate 26'. The membrane permeate 24' may be used to regenerate a spent strong base anion resin (i.e., a resin that has been previously been used and its capacity exhausted), such as in a decolorization process. The spent strong base anion resin is regenerated by passing the membrane permeate 24' through the spent strong base anion resin in the decolorization system 16' in the same manner as discussed above for FIG. 3. The membrane retentate 26' may, optionally, be combined with the spent regenerant 30' from the decolorization system 16' and the remainder of the raffinate fraction 20' from the chromatographic system 12' since the compositions of each are similar although the combined retentate and permeate may be more colored. By combining the similar compositions, any additional handling or processing of the raffinate fraction 20' may be conducted on a single stream, avoiding processing complications. The chromatographic product 22' from the chromatographic system 12' may be passed through the decolorization system 16' to decolorize the liquid and produce a decolorized product 32', such as decolorized sucrose. The decolorized product 32' may be much lower in color than the initial color of the chromatographic product 22' (e.g., the high purity sugar solution). Thus, subsequent crystallization of the sucrose may be conducted without using special procedures, and a high purity, low color sucrose product may be achieved.

Using embodiments of the disclosure, color that was initially in the chromatographic product 22' (e.g., extract) may be transferred to the final raffinate 34'. This approach is very different from a conventional decolorization process where the color of the extract is reduced, but chemicals or other additives are used to regenerate the spent resin and an undesirable, highly colored waste stream is created. Compared to conventional decolorization, embodiments of the disclosure are advantageously used in a sugar beet factory because no extraneous chemicals are used beyond those already present in the raffinate fraction 20'. Additionally, no regenerant waste stream is produced since the combined membrane retentate 26' and the spent regenerant 30' have the same or a similar composition as the raffinate fraction 20', except exhibiting a somewhat higher color. Therefore, the membrane retentate 26' and the spent regenerant 30' are simply combined with the raffinate fraction 20' downstream of the collection point, which does not change the composition of the raffinate fraction 20'. The combined remainder of the raffinate fraction 20', membrane retentate 26', and spent regenerant 30' may be used in the conventional manner as animal feed since the higher color content is not a concern.

As shown in FIG. 4, the system 10' may include one or more vessels 36' that concentrate the raffinate fraction 20', in addition to the chromatographic system 12', nanofiltration system 14', and decolorization system 16'. As previously discussed above, the biomass feed stream 18' may include a molasses feed stream that is introduced to and passed through the chromatographic system 12', producing the raffinate fraction 20', which is the salt-containing fraction, and the chromatographic product 22' (e.g., extract fraction), which contains the desired sucrose and the color bodies to be removed. The raffinate fraction 20' may be passed through the vessels 36' in a progressive concentration of the raffinate fraction 20'. The vessels 36' may be conventional raffinate evaporators, which are commonly used when processes use chromatographic separation. A portion of the raffinate fraction 20' collected from the first evaporator or other evaporator may be passed through the nanofiltration system 14'. The size of the raffinate fraction 20' passed through the nanofiltration system 14' may be determined depending on the operating capacity of the strong base anion resin used in the decolorization system 16'. The portion of the raffinate fraction 20' passed into the nanofiltration system 14' may be at about 10% salts. By way of example only, the 10% concentration is illustrative of a strong base anion resin that regenerates well with a 10% dissolved solids salt solution. However, lower or higher concentrations may be used depending on the strong base anion resin used in the decolorization system 16' and on operating parameters, such as pressure drop through the columns of the decolorization system 16'. Higher concentrations of the raffinate fraction 20' will result in higher pressure drop through the columns of the decolorization system 16'.

The 10% salt-containing raffinate fraction 20' is processed though the nanofiltration membrane of the nanofiltration system 14' to produce the salt-containing membrane permeate 24' that has a reduced color (compared to the raffinate feed stream) and reduced content of high molecular weight compounds. The remaining color and high molecular weight compounds from the raffinate fraction 20' are in the membrane retentate 26'. The membrane permeate 24' is used to regenerate the spent strong base anion resin in the decolorization system 16', and the regenerated strong base anion resin may be used to decolorize the chromatographic product 22' (e.g., extract fraction) from the chromatographic system 12'. By decolorizing the chromatographic product 22', problems with subsequent recrystallization of the sucrose may be reduced or eliminated since the resulting extract product is of lower color. The spent regenerant 30' is combined with the remainder of the raffinate fraction 20' downstream of the vessel where the raffinate was collected. The membrane retentate 26' is also returned downstream of the vessel where the raffinate was collected. The raffinate fraction 20', spent regenerant 30', and membrane retentate 26' may be transported through the remaining vessels and concentrated to produce a final, concentrated raffinate 34', which is sold as animal feed.

While FIG. 4 illustrates the process acts as happening sequentially, the process acts may be occurring simultaneously. For example, the raffinate fraction 20' may be collected from the chromatographic system 12' and passed through the membrane of the nanofiltration system 14' at the same time that the chromatographic product 22' containing the sucrose is being decolorized on a previously regenerated strong base anion resin. Alternatively, if the decolorization system 16' contains multiple decolorization columns, such as a carousel system, the process acts may occur simultaneously and continuously with different operations occurring in different columns of the decolorization system. If the decolorization system 16' includes one or more decolorization columns, the chromatographic product 22' may be decolorized on one or more decolorization columns while regeneration is occurring on one or more decolorization columns. By way of example only, if the decolorization system 16' includes three columns, two of the columns may be run in series to decolorize the chromatographic product 22' (e.g., extract fraction) containing the sucrose while the strong base anion resin of the third column is being regenerated. Thus, the efficient and continuous operation of the chromatographic system 12', the vessels 36' (e.g., evaporators), the decolorization system 16', and the nanofiltration system 14' are not interrupted.

The following Examples are given to illustrate embodiments of the disclosure in more detail. The Examples are not to be construed as being exhaustive or exclusive as to the scope hereof. The Examples are given for illustrative purposes.

EXAMPLES

Example I

A partially concentrated raffinate (raffinate fraction) was collected from a multiple effect evaporator. This raffinate was produced by a sugar beet factory chromatographic separator, which was processing molasses. The partially concentrated raffinate was passed through a Trisep 38378-UA60-31 membrane module (nanofiltration system), the membrane having a 1,000 dalton molecular weight cut-off. The operating parameters for the membrane module were a temperature of 45° C., 13.2 liters/meter$^2$/hour (LMH), an inlet pressure of from about 200 psi to about 250 psi, and a volume concentration factor (VCF) of about 2.0. Samples of the feed, permeate, and retentate were collected at 15 minutes, 4 hours, and 9 hours. The refractometric dry substance (RDS), pH, conductivity, color, percentage of color elimination, and percentage of salt of the samples were measured by conventional techniques. Table 1 includes the results across the membrane module for a 9 hour exhaustion period.

TABLE 1

Operating Results Across the Membrane Module.

| Sample | RDS | pH | Cond (mS) | Color (ICUMSA) | % color elimination | ~% salt |
|---|---|---|---|---|---|---|
| 15 min. Feed | 30.9 | 8.6 | 55.5 | 64,300 | | |
| 15 min. Permeate | 28.1 | 8.66 | 61.7 | 13,900 | 90.3 | 11.2 |
| 15 min. Retentate | 34.5 | 8.68 | 50.6 | 95,100 | | |
| 4 hr Feed | 31.6 | 8.66 | 55.1 | 63,600 | | |
| 4 hr Permeate | 28.0 | 8.67 | 62.0 | 14,900 | 89.8 | 13.0 |
| 4 hr Retentate | 34.0 | 8.66 | 51.1 | 96,300 | | |
| 9 hr Feed | 31.5 | 8.67 | 56.0 | 63,700 | | |
| 9 hr Permeate | 27.9 | 8.68 | 62.6 | 16,100 | 89.0 | 10.8 |
| 9 hr Retentate | 34.0 | 8.66 | 51.6 | 94,200 | | |

Processing the partially concentrated raffinate through the membrane module results in 10% of the color passing to the permeate (90% elimination). Additionally, the salt concentration was less than about half of the total dissolved solids in the permeate. However, and as discussed below, this raffinate was determined to be capable of regenerating the spent decolorization resin.

The membrane permeate was collected and tested as a regenerant for a spent strong base anion resin set-up that included PUROLITE® A860S resin at a column height of 24 inches and column diameter of 2 inches. Exhaustion was with chromatographic molasses separator extract from the same system from which the raffinate was collected. The exhaustion flow rate was 12 bed volumes/hour, the exhaustion endpoint as resin color loading was about 50,000 g color/ml resin, and the exhaustion temperature was about 50° C.-80° C. maximum. The regeneration with the membrane permeate was conducted at a regeneration flow rate of about 12 bed volumes/hour, a regenerant quantity of about 3 bed volumes, and a regeneration temperature of about 70° C. Table 2 lists the results of decolorization of the chromatographic separator extract. Because virgin resin will provide misleading results during initial cycles due to very high color elimination, Table 2 lists the results after many exhaustion/regeneration cycles when operation was equilibrated (e.g., at equilibrium). The analysis of the membrane permeate for regeneration and the extract feed for decolorization varies in Table 2 because the materials were collected from a factory chromatography process over several days and reflect typical variations in the factory operation. For each sample, the number of exhaustion/regeneration cycles conducted is indicated by the number following the sample name.

TABLE 2

Decolonization Results for the Membrane Permeate

| Sample | RDS | Density | Color (ICUMSA) | pH | % decolorization |
|---|---|---|---|---|---|
| Extract feed 138 | 32.7 | 1.140 | 9120 | 10.3 | |
| Extract product cycle 138 | 33.0 | 1.141 | 3984 | 10.3 | 56.3 |
| Regenerant Feed Cycle 138 | 27.4 | 1.117 | 14664 | 8.6 | |
| Spent regenerant Cycle 138 | 25.3 | 1.117 | 52976 | 10.3 | |
| Extract feed 147 | 31.9 | 1.136 | 7883 | 10.4 | |
| Extract product cycle 147 | 32.2 | 1.137 | 3390 | 10.3 | 57.0 |
| Regenerant Feed Cycle 147 | 27.5 | 1.130 | 14623 | 8.6 | |
| Spent regenerant Cycle 147 | 25.6 | 1.130 | 50699 | 10.3 | |
| Extract feed 154 | 32.6 | 1.139 | 7322 | 10.4 | |
| Extract product cycle 154 | 32.8 | 1.140 | 3371 | 10.3 | 54.0 |
| Regenerant Feed Cycle 154 | 27.4 | 1.123 | 14391 | 8.6 | |
| Spent regenerant Cycle 154 | 25.6 | 1.123 | 48268 | 10.3 | |
| Extract feed 163 | 31.5 | 1.134 | 7547 | 10.3 | |
| Extract product cycle 163 | 31.9 | 1.136 | 3310 | 10.3 | 56.1 |
| Regenerant Feed Cycle 163 | 27.5 | 1.131 | 13850 | 8.6 | |
| Spent regenerant Cycle 163 | 25.6 | 1.131 | 46732 | 10.3 | |

As shown in Table 2, the membrane permeate efficiently regenerated the PUROLITE® A860S resin and resulted in a subsequent extract color removal of about 55%. Additionally, the color elimination from the extract fraction enabled direct production of crystallized white sugar from the extract fraction. Since the membrane permeate was used to regenerate the resin, the process produced no regenerant waste stream. Thus, it was determined that the raffinate fraction from the molasses feed stream was capable of regenerating the spent strong base anion resin. This result is surprising compared to the conventional method of using a pure, or nearly pure, solution of NaCl/NaOH to regenerate the spent resin.

What is claimed is:

1. A method of regenerating a strong base anion resin comprising:
   collecting a salt-containing product from a chromatographic system, the chromatographic system configured to process a biomass derived material;
   processing the salt-containing product through a nanofiltration membrane to collect a salt-containing permeate; and
   utilizing the salt-containing permeate to regenerate a strong base anion resin.

2. The method according to claim 1, wherein collecting a salt-containing product from a chromatographic system configured to process a biomass derived material comprises collecting the salt-containing product from the chromatographic system configured to process a biomass derived material comprising cellulosic biomass, hydrolyzed biomass, wood, sugar beet, sugar cane, fruits, vegetables, corn, fermented biomass, or reactor product biomass.

3. The method according to claim 1, wherein utilizing the salt-containing permeate to regenerate a strong base anion resin comprises regenerating an acrylic type strong base anion resin or a styrenic type strong base anion resin.

4. The method according to claim 1, wherein collecting a salt-containing product from a chromatographic system comprises collecting the salt-containing product collected from the chromatographic system and concentrating the salt-containing product to about 2% to about 15% salt on dissolved solids prior to processing the salt-containing product through the nanofiltration membrane.

5. The method according to claim 1, wherein processing the salt-containing product through a nanofiltration membrane to collect a salt-containing permeate comprises collecting the salt-containing permeate and concentrating the salt-containing permeate to about 2% to about 15% salt on dissolved solids after processing the salt-containing product through the nanofiltration membrane.

6. A method for regenerating a strong base anion resin, the method comprising:

collecting a salt-containing product from a chromatographic system, the chromatographic system configured to process a sugar beet derived material;

processing the salt-containing product through a nanofiltration membrane to collect a salt-containing permeate; and utilizing the salt-containing permeate to regenerate a strong base anion resin.

7. The method according to claim 6, wherein the salt-containing product collected from the chromatographic system is concentrated to between about 2% and about 15% salt on dissolved solids prior to processing through the nanofiltration membrane.

8. The method according to claim 6, wherein processing the salt-containing product through a nanofiltration membrane to collect a salt-containing permeate comprises concentrating the salt-containing permeate to between about 2% and about 15% salt on dissolved solids after processing through the nanofiltration membrane.

9. The method according to claim 6, wherein collecting a salt-containing product from a chromatographic system configured to process a sugar beet derived material comprises collecting the sugar beet derived material from the chromatographic system configured to process a runoff from the sugar crystallization process.

10. The method according to claim 6, further comprising utilizing the regenerated strong base anion resin to decolorize a product from a chromatographic system.

11. A method of regenerating a strong base anion resin, the method comprising:

processing a biomass feed stream through a chromatographic system to produce an extract fraction and a raffinate fraction;

flowing a portion of the raffinate fraction through a nanofiltration membrane to produce a membrane permeate and a membrane retentate; and flowing the membrane permeate into a decolorization system containing a spent strong base anion resin to regenerate the strong base anion resin.

12. The method of claim 11, wherein processing a biomass feed stream through a chromatographic system comprises processing a molasses feed stream.

13. The method of claim 11, wherein processing a biomass feed stream through a chromatographic system to produce an extract fraction and a raffinate fraction comprises producing the raffinate fraction comprising salts.

14. The method of claim 11, wherein processing a biomass feed stream through a chromatographic system to produce an extract fraction and a raffinate fraction comprises producing the raffinate fraction comprising chloride anions or sulfate anions.

15. The method of claim 11, wherein flowing the membrane permeate into a decolorization system containing a spent strong base anion resin comprises desorbing color bodies from the spent strong base anion resin.

16. The method of claim 11, further comprising combining the remainder of the raffinate fraction, the membrane retentate, and spent regenerant to produce a final raffinate.

17. A system, comprising:

a chromatographic system configured to separate a biomass feed stream into an extract fraction and a raffinate fraction;

a nanofiltration system configured to filter the raffinate fraction and produce a membrane permeate and a membrane retentate; and a decolorization system configured to decolorize the extract fraction and to regenerate a spent strong base anion resin using the membrane permeate.

* * * * *